(12) United States Patent
Kang et al.

(10) Patent No.: US 11,646,810 B2
(45) Date of Patent: May 9, 2023

(54) METHOD FOR PERFORMING PORT CONFIGURATION OF 5G SYSTEM FOR PROVIDING TIME SYNCHRONIZATION SERVICE AND NETWORK ENTITY PERFORMING THE SAME

(71) Applicant: ELECTRONICS AND TELECOMMUNICATIONS RESEARCH INSTITUTE, Daejeon (KR)

(72) Inventors: Yoo Hwa Kang, Daejeon (KR); Changki Kim, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 17/517,762

(22) Filed: Nov. 3, 2021

(65) Prior Publication Data

US 2022/0149964 A1    May 12, 2022

(30) Foreign Application Priority Data

Nov. 9, 2020    (KR) .................. 10-2020-0148584
Oct. 27, 2021   (KR) .................. 10-2021-0144525

(51) Int. Cl.
*H04W 56/00*   (2009.01)
*H04J 3/06*    (2006.01)
*H04L 41/0816* (2022.01)

(52) U.S. Cl.
CPC ........ *H04J 3/0685* (2013.01); *H04L 41/0816* (2013.01); *H04W 56/0015* (2013.01)

(58) Field of Classification Search
CPC .......... H04L 41/0806; H04L 41/0816; H04W 56/0015; H04J 3/0667; H04J 3/0685; H04J 3/12
(Continued)

(56) References Cited

U.S. PATENT DOCUMENTS

2020/0329441 A1   10/2020   Ha et al.
2020/0404697 A1   12/2020   Yang et al.
(Continued)

OTHER PUBLICATIONS

3rd Generation Partnership Project; Technical Specification Group Services and System Aspects; Study on enhanced support of Industrial Internet of Things (IIoT) in the 5G System (5GS) (Release 17), 3GPP TR 23.700-20 V1.2.0 (Nov. 2020).
(Continued)

*Primary Examiner* — Robert J Lopata
(74) *Attorney, Agent, or Firm* — LRK Patent Law Firm (57) ABSTRACT

Provided are a method for performing port configuration of a 5G system (5GS) for providing a time synchronization service, and a network entity performing the same. A method for performing port configuration may include: when a grandmaster (GM) is determined to be a Time Sensitive Networking (TSN) GM outside the 5GS, performing, by a Network Exposure Function (NEF), port configuration of the 5GS in a Best Master Clock Algorithm (BMCA) scheme; and when the GM is determined to be a 5GS GM inside the 5GS, or the TSN GM outside the 5GS that does not support the BMCA, performing, by the NEF, port configuration of the 5GS in an external port configuration scheme.

20 Claims, 5 Drawing Sheets

(58) Field of Classification Search
USPC .......................................................... 370/329
See application file for complete search history.

(56) References Cited

U.S. PATENT DOCUMENTS

| 2021/0099341 | A1* | 4/2021 | Moon | ............... | H04W 72/0446 |
| 2022/0030530 | A1* | 1/2022 | Munz | .................. | H04L 12/4625 |
| 2022/0046570 | A1* | 2/2022 | Moon | ............... | H04W 56/0015 |
| 2022/0103335 | A1* | 3/2022 | Moon | ..................... | H04L 7/005 |

OTHER PUBLICATIONS

ETRI, "KI #3B: Conclusions updates on BMCA reports", 3GPP TSG-WG SA2 Meeting #142E, S2-2008580, Nov. 16-20, 2020, Elbonia.
ETRI, "KI#3B: Sol #7 updates on BMCA reports", 3GPP TSG-WG SA2 Meeting #142F, S2-2008581, Nov. 16-20, 2020, Elbonia.

* cited by examiner

METHOD FOR PERFORMING PORT CONFIGURATION OF 5G SYSTEM FOR PROVIDING TIME SYNCHRONIZATION SERVICE AND NETWORK ENTITY PERFORMING THE SAME

CROSS-REFERENCE TO RELATED APPLICATIONS

This application claims priority to and the benefit of Korean Patent Application No. 10-2020-0148584 filed in the Korean Intellectual Property Office on Nov. 9, 2020, and Korean Patent Application No. 10-2021-0144525 filed in the Korean Intellectual Property Office on Oct. 27, 2021, the entire contents of which are incorporated herein by reference.

BACKGROUND OF THE DISCLOSURE

1. Field of the Invention

The present disclosure relates to a method for performing port configuration of a 5G system (5GS) for providing a time synchronization service, and a network entity performing the same. In particular, the present disclosure relates to a method for transmitting a port configuration information of a 5GS, and an Announce message information, in order to provide a time synchronization service through exposure in a Time Sensitive Networking (TSN) and a Non-TSN environments.

2. Description of Related Art

The 3rd Generation Partnership Project (3GPP), which is a standardization organization for mobile communication technologies, has completed standardization work for the 5G system to support IEEE TSN from Release 16, and is currently under maintenance. According to the 3GPP TS 23.501 standard, the 5G system is defined as one logical TSN bridge, and deterministic communication is provided by interworking with the TSN network. In order to accommodate deterministic applications in the non-TSN environment, Release 17 study was conducted for 3GPP to provide a time synchronization service and a time-sensitive communication service using an Application Function (AF) and a 5GS exposure technology.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

A problem to be solved by the present disclosure is to provide a method for performing port configuration of a 5GS for providing a time synchronization service, and a network entity performing the same, capable of providing a time synchronization service through a time synchronization service exposure in a TSN and non-TSN environments.

In addition, a problem to be solved by the present disclosure is to provide a method for performing port configuration of a 5GS for providing a time synchronization service, and a network entity performing the same, in which a Network Exposure Function (NEF) can transmit a port configuration information of the 5GS and an Announce message in order to provide a time synchronization service through a time synchronization service exposure in a TSN and a non-TSN environments.

An example embodiment of the present disclosure provides a method for performing port configuration of a 5G system (5GS) for providing a time synchronization service, including: when a grandmaster (GM) is determined to be a Time Sensitive Networking (TSN) GM outside the 5GS, performing, by a Network Exposure Function (NEF), port configuration of the 5GS in a Best Master Clock Algorithm (BMCA) scheme; and when the GM is determined to be a 5GS GM inside the 5GS, or the TSN GM outside the 5GS that does not support the BMCA, performing, by the NEF, port configuration of the 5GS in an external port configuration scheme.

According to an embodiment of the present disclosure, the method may further include: when the NEF performs port configuration of the 5GS in the BMCA scheme, receiving, by the NEF, a BMCA result from a Network TSN Translator (NW-TT).

According to an embodiment of the present disclosure, the method may further include: transmitting, by the NEF, a port configuration information and an Announce information to a Device Side TSN Translator (DS-TT) based on the BMCA result.

According to an embodiment of the present disclosure, the port configuration information and the Announce information may be transmitted from the NEF to the DS-TT through a Port Management Information Container (PMIC) signaling.

According to an embodiment of the present disclosure, an Announce message according to the Announce information may be created at a port configured as a master according to the BMCA result.

According to an embodiment of the present disclosure, the method may further include: when the NEF performs port configuration of the 5GS in the external port configuration scheme, transmitting, by the NEF, a port configuration information and an Announce information to a NW-TT or a DS-TT.

According to an embodiment of the present disclosure, when the NEF transmits the port configuration information and the Announce information to the NW-TT, the port configuration information and the Announce information may be transmitted through a Bridge Management Information Container (BMIC) signaling or a PMIC signaling.

According to an embodiment of the present disclosure, when the NEF transmits the port configuration information and the Announce information to the DS-TT, the port configuration information and the Announce information may be transmitted through a PMIC signaling.

According to an embodiment of the present disclosure, an Announce message according to the Announce information may be created at a port configured as a master according to the BMCA result.

Another embodiment of the present disclosure provides, a method for performing port configuration of a 5GS for providing a time synchronization service, including: when a GM is determined to be a TSN GM outside the 5GS, adding, by a NW-TT, a port configuration information to an Announce message based on a BMCA result; and transmitting, by the NW-TT, the Announce message to a DS-TT.

According to an embodiment of the present disclosure, the Announce message may be transmitted to another network entity at a port configured as a master according to the BMCA result.

Yet another embodiment of the present disclosure provides a network entity performing port configuration of a 5GS for providing a time synchronization service, including: a network interface configured to transmit and receive data to and from other network entities; and a processor configured to perform port configuration of the 5GS in a BMCA scheme when a GM is determined to be a TSN GM, and perform port configuration of the 5GS in an external port configuration scheme when the GM is determined to be a 5GS GM inside the 5GS, or the TSN GM outside the 5GS that does not support the BMCA.

According to an embodiment of the present disclosure, when performing port configuration of the 5GS in the BMCA scheme, the processor may receive a BMCA result from a NW-TT.

According to an embodiment of the present disclosure, based on the BMCA result, the processor may transmit a port configuration information and an Announce information to a DS-TT.

According to an embodiment of the present disclosure, the port configuration information and the Announce information may be transmitted from the NEF to the DS-TT through a PMIC signaling.

According to an embodiment of the present disclosure, an Announce message according to the Announce information may be created at a port configured as a master according to the BMCA result.

According to an embodiment of the present disclosure, when the NEF performs port configuration of the 5GS in the external port configuration scheme, the processor may transmit a port configuration information and an Announce information to a NW-TT or a DS-TT.

According to an embodiment of the present disclosure, when the NEF transmits the port configuration information and the Announce information to the NW-TT, the port configuration information and the Announce information may be transmitted through a BMIC signaling or a PMIC signaling.

According to an embodiment of the present disclosure, when the NEF transmits the port configuration information and the Announce information to the DS-TT, the port configuration information and the Announce information may be transmitted through a PMIC signaling.

According to an embodiment of the present disclosure, an Announce message according to the Announce information may be created at a port configured as a master according to the BMCA result.

DETAILED DESCRIPTION OF THE EMBODIMENTS

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein. In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements.

Figure 1:
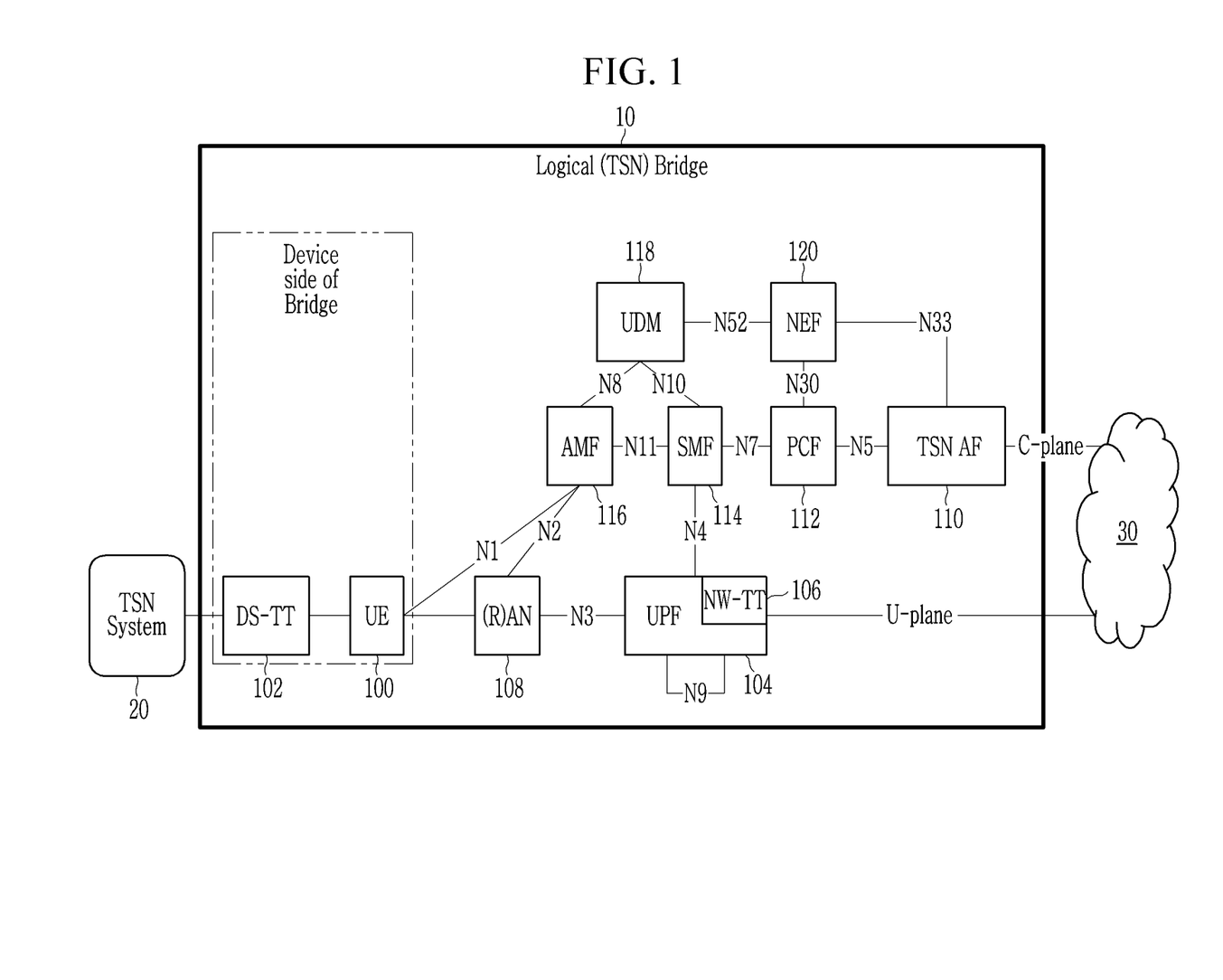
FIG. 1 illustrates a 5G system architecture operating as a TSN bridge.

FIG. 1 illustrates a 5G system architecture operating as a TSN bridge.

Referring to FIG. 1, a 5G system architecture operating as a TSN bridge may include a 5G system 10 operating as a logical TSN bridge, and a TSN system 20 and a TSN network 30 as TSN end nodes that exchange data and communicate with each other using the 5G system 10 as a TSN bridge.

That is, the architecture of FIG. 1 is an architecture extended to support a Time Sensitive Communication (TSC) in the 5G system 10. The 5G system 10 operates as a TSN bridge for integration with an external TSN network, and translators (TTs) 102, 106 and a TSN Application Function (TSN AF) 110 are added to the architecture including the existing an User Equipment (UE) 100, an User Plane Function (UPF) 104, a Radio Access Network (RAN) 108, a Policy Control Function (PCF) 112, a Session Management Function (SMF) 114, an Access and Mobility Management Function (AMF) 116, a Unified Data Management (UDM) 118 and a Network Exposure Function (NEF) 120 for communication with the TSN network. The TSN translators 102, 106 for interworking with the TSN network may include a Device Side TSN Translator (DS-TT) 102 and a Network TSN Translator (NW-TT) 106, and each DS-TT 102 and NW-TT 106 has ports for transmitting or receiving traffics for communication with the TSN network. In addition to the translators in an User Plane, the TSN AF 110 in a Control Plane may communicate with a Centralized Network Configuration (CNC) of the TSN network to transmit and receive control information between the 5G system and the TSN network.

Specifically, the TSN-AF 110 may transmit and receive control information for the TSN network (e.g., CNC) and the 5G system 10 to operate as a logical TSN bridge to control the 5G bridge system 10, the DS-TT 102 and the NW-TT 104 are TSN converters that process TSC traffic through a transparent connection with a TSN system outside the 5G system 10, on the UE 100 side and the network side, respectively.

3GPP Release 16 allows 5GS to provide a time synchronization service by configuring the state of each port in the external port configuration scheme defined in IEEE 802.1AS, and to provide deterministic communication interworking with TSN. In addition, 3GPP Release 17, in addition to the external port configuration scheme, supports a Best Master Clock Algorithm (BMCA) scheme for a time synchronization service, and has started a study to provide Non-TSN applications (refer to Table 1). According to 3GPP TS 22.104 (cyber-physical control applications in vertical domain) and TS 22.263 (VIAPA: Video, Imaging and Audio for Professional Applications) requirements, in order for the 5GS to support not only a TSN, but also deterministic applications in various Non-TSN environments such as VIAPA, it is necessary to provide a time synchronization service exposure function through AF.

TABLE 1

|  | Release 16 | Release 17 |
| --- | --- | --- |
| Port State Configuration | External Port Configuration | BMCA (automatically network configuration) |
| Deployment | TSN | Non-TSN |
| Service Exposure | — | Time Synchronization Service Exposure |
| Time Synchronization Scheme | TSN GM (Network side) - (1) | TSN GM (Device side) - (1)<br>5G GM (NW-TT) - (2)<br>5G GM (DS-TT) - (3), (4) |

Figure 2:
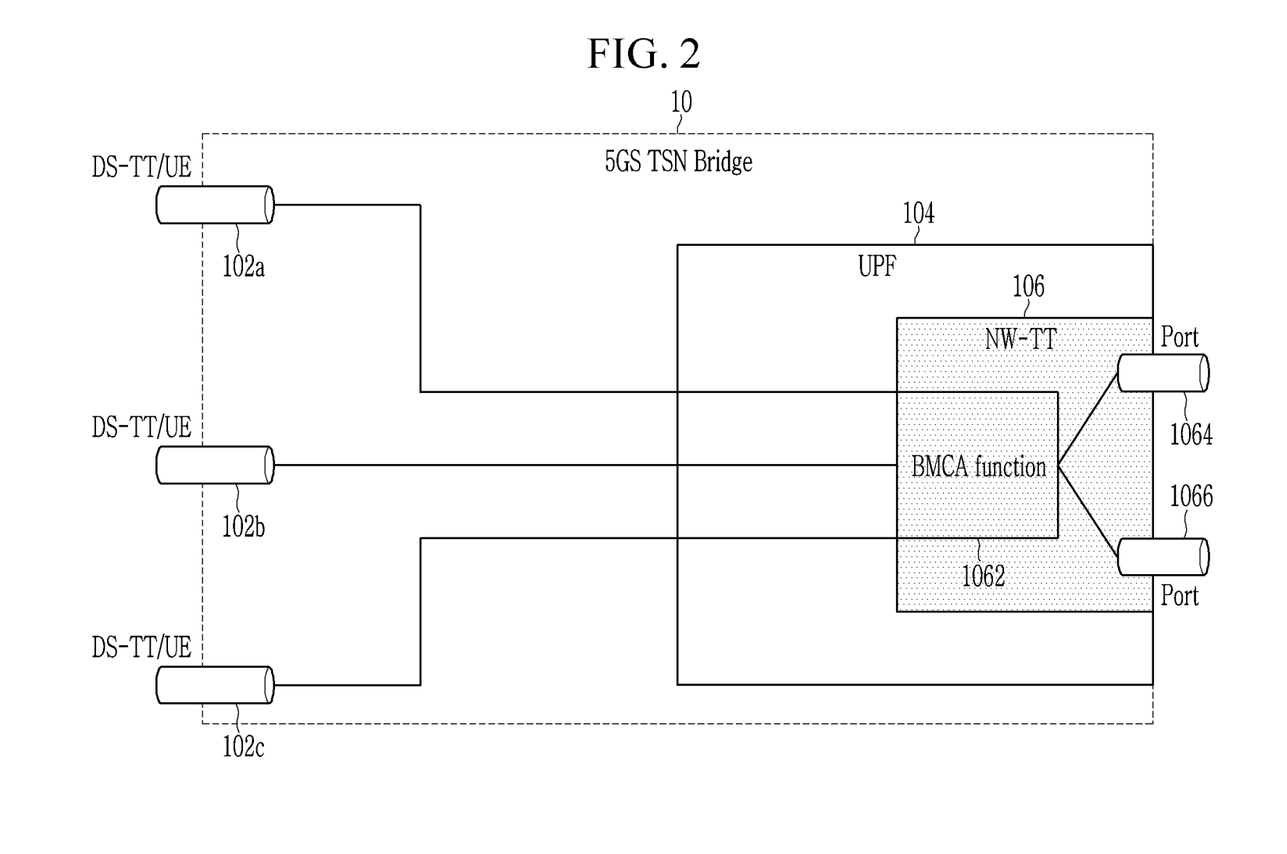
FIG. 2 illustrates a 5GS TSN bridge supporting a BMCA proposed in 3GPP TR 23.700-20 (FS_IIoT, Study on enhanced support of Industrial IoT in the 5G System (Release 17)).

FIG. 2 illustrates a 5GS TSN bridge supporting a BMCA proposed in 3GPP TR 23.700-20 (FS_IIoT, Study on enhanced support of Industrial IoT in the 5G System (Release 17)).

Referring to FIG. 2, the BMCA function is performed in the NW-TT 106, and a part of the BMCA function may be performed by the Ingress Port according to the FS_IIoT study result. The DS-TT (102a, 102b, 102c) may transmit the received (g)PTP (IEEE 802.1AS, IEEE 1588) Announce message as data to the NW-TT (106), and the NW-TT (106) may perform the BMCA procedure using the received Announce message. As a result of performing the BMCA, the NW-TT 106 may manage the master-slave structure by determining the state of each port. 3GPP Release 16 defines a TSN AF as a control function for interworking with the TSN, and if registration is made so that the TSN AF receives the BMCA result, the NW-TT 106 reports the BMCA result to the TSN AF.

In 5GS, a NW-TT or a DS-TT may operate as a (g)PTP grand master (GM), and may create Announce messages for the master port, respectively. In 3GPP Release 17, a standard study to support such a time synchronization service exposure has begun. An AF with a requirement for a time synchronization can see a Capability that the 5GS exposes, request a time synchronization service, or provide time synchronization information together. The time synchronization service provided in this way may support both Ethernet and IP PDU sessions. A 5GS can provide the following 4 time synchronization schemes to support applications that require time synchronization services in a non-TSN environment.

(1) A case where a GM exists outside of the 5GS, and the 5GS operates as a (g)PTP client (2) A case where a GM exists inside the 5GS, the 5GS operates as a (g)PTP GM, and a UPF/NW-TT provides a time synchronization scheme that supports (g)PTP messages (3) A case where a GM exists inside the 5GS, the 5GS operates as a (g)PTP GM, a 5G-AN provides a 5GS reference time in UE, and the UE provides a time synchronization scheme according to implementation manner (4) A case where a GM exists inside the 5GS, the 5GS operates as a (g)PTP GM, and a DS-TT provides a time synchronization method supporting (g)PTP message Referring to Table 1, among the 4 time synchronization schemes, (1) is provided in Release 16, and (2) to (4) are newly proposed in Release 17. Since (3) may operate separately from the 3GPP standard depending on the desired implementation, the time synchronization schemes of (1), (2), and (4) performed through exposure is mainly considered in the present disclosure.

The NEF exposes the time synchronization schemes (1) to (4), and the AF may request activation/deactivation of a time synchronization service by specifying clock domain (the TSN GM or the 5G GM) related parameters (for example, (g)PTP versions, Domain Number, grandmaster priorities) and clock accuracy parameters (for example, sending rate, initial Announce interval) for one UE or group of UEs. In addition, the AF may additionally provide parameters required for a BMCA operation. Embodiments of the present disclosure provide a method for the NEF performing the exposure to provide a time synchronization service.

In particular, in 3GPP Release 16, the 5GS was interworking with the TSN to provide, and in Release 17, it is intended to provide a time synchronization service for applications requiring deterministic communication even in the non-TSN environment. To this end, a time synchronization service is provided using the AF and exposure functions, and the 5GS provides the above-mentioned 4 time synchronization schemes so that the AF can activate/deactivate the time synchronization service.

In the case of the conventional 5GS, the TSN AF was in charge of control in the TSN environment, but when the time synchronization service is provided using the exposure function, the NEF may be in charge of control. Hereinafter, a method in which the NEF configures a port state according to the time synchronization schemes (1), (2), and (4), and transmits an Announce information for creating an Announce message in each port will be described.

According to embodiments of the present disclosure, in a case where the TSN AF in charge of control does not exist in a TSN environment, or when the AF requests a time synchronization service using an exposure to support an application such as VIAPA in the Non-TSN environment, the NEF is in charge of the time synchronization service control. Specifically, the NEF may configure a port state to the DS-TT or the NW-TT for the time synchronization service, and may transmit an Announce information through a PMIC/BMIC signaling to create an Announce message at the master port. On the other hand, when the NW-TT performs a BMCA to provide a time synchronization service dynamically, the NEF may receive a result from the NW-TT and perform port configuration to the DS-TT.

That is, a method for performing port configuration of a 5GS for providing a time synchronization service according to an embodiment of the present disclosure, may include: when a GM is determined to be a TSN GM outside the 5GS, performing, by a NEF, port configuration of the 5GS in a BMCA scheme; and when the GM is determined to be a 5GS GM inside the 5GS, or the TSN GM outside the 5GS that does not support the BMCA, performing, by the NEF, port configuration of the 5GS in an external port configuration scheme.

Figure 3:
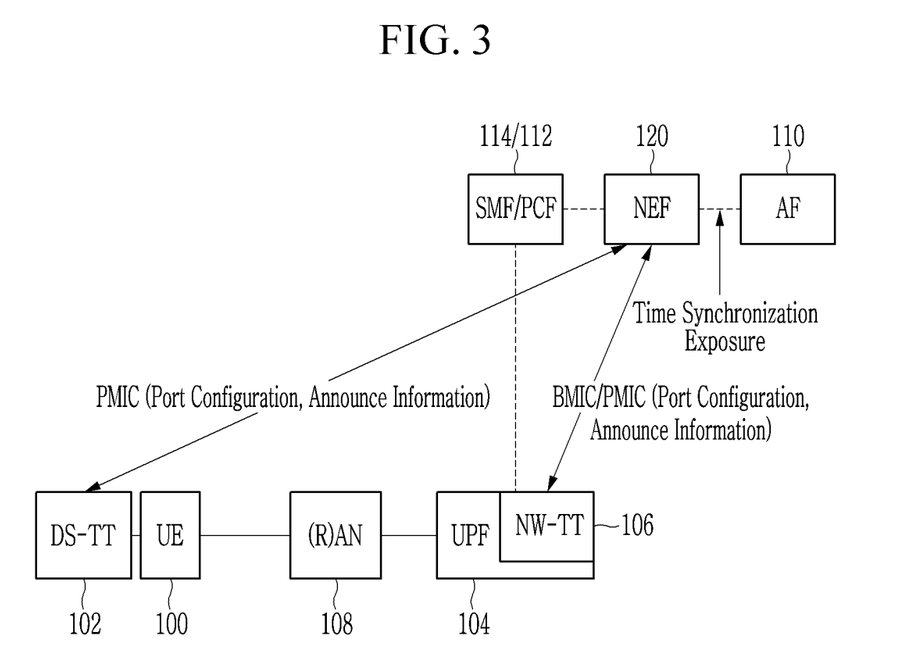
FIG. 3 illustrates a method for a NEF to perform port configuration in an external port configuration scheme according to an embodiment of the present disclosure.

FIG. 3 illustrates a method for a NEF to perform port configuration in an external port configuration scheme according to an embodiment of the present disclosure.

Referring to FIG. 3, when the AF 110 requests a time synchronization service exposure, the NEF 120 may perform external port configuration. When the time synchronization scheme requested by the AF 110 is a 5G GM, or a TSN GM in which the BMCA is not supported, the NEF 120 may perform an external port configuration. In this case, in order to transmit a port state of the DS-TT 102 and the NW-TT 106 and an information for creating an Announce message, the NEF 120 may use the PMIC/BMIC signaling used between the TSN AF 110 and the DS-TT/NW-TT as it is. However, a port state and an Announcement information (e.g., an Announcement message information such as system identity, grand master clock identity, etc.) should be added to the conventional PMIC/BMIC.

That is, a method for performing port configuration of a 5GS for providing a time synchronization service according to an embodiment of the present disclosure, may include: when the NEF 120 performs port configuration of the 5GS by the external port configuration scheme, transmitting, by the NEF, a port configuration information and an Announce information to the NW-TT 106 or the DS-TT 102. In an embodiment, when the NEF 120 transmits the port configuration information and the Announce information to the NW-TT 106, the port configuration information and the Announce information may be transmitted through the BMIC signaling or the PMIC signaling. Meanwhile, in an embodiment, when the NEF 120 transmits the port configuration information and the Announce information to the DS-TT 102, the port configuration information and the Announce information may be transmitted through the PMIC signaling. Accordingly, an Announce message according to Announce information may be created at a port configured as a master according to the BMCA result.

Figure 4:
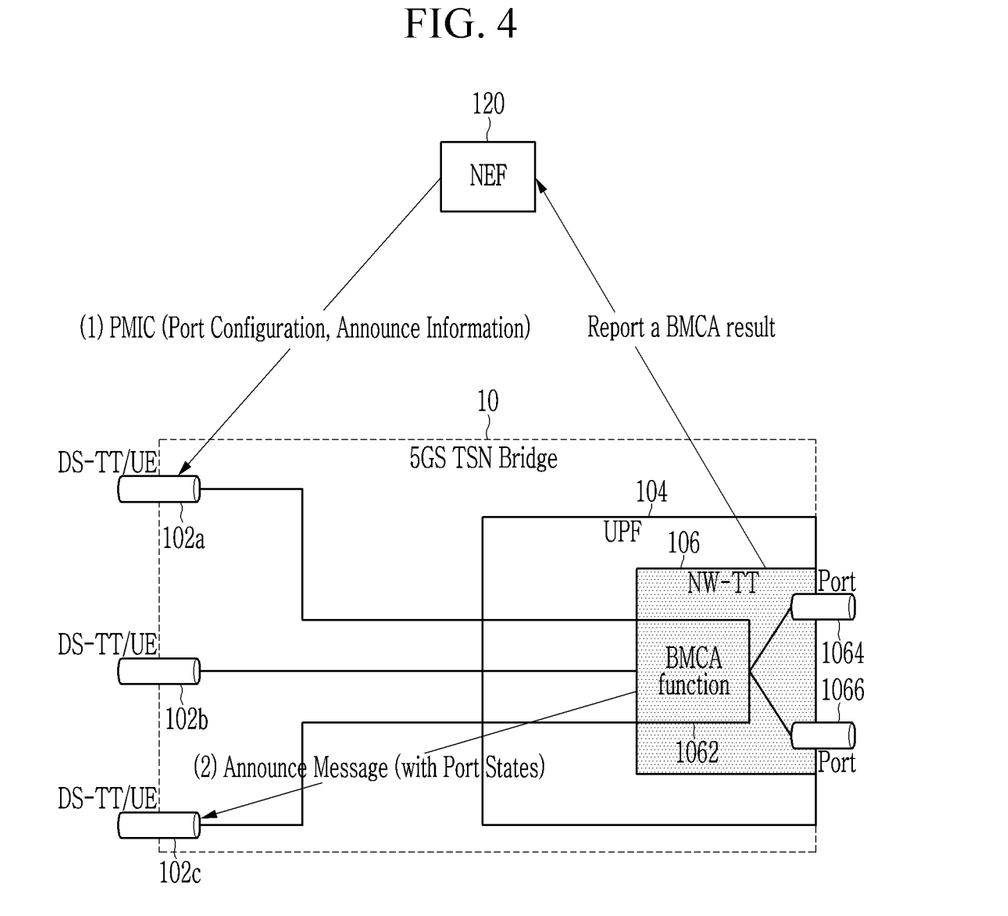
FIG. 4 illustrates a method for a NEF to perform port configuration in a BMCA scheme according to an embodiment of the present disclosure.

FIG. 4 illustrates a method for a NEF to perform port configuration in a BMCA scheme according to an embodiment of the present disclosure.

Referring to FIG. 4, when the AF requests the TSN GM scheme through the time synchronization service exposure, the BMCA 1062 may operate. The BMCA 1062 may operate on the NW-TT 106 and report the result to the NEF 120. According to the reported BMCA result, the NEF 120 may transmit the port state and the Announce information together through the PMIC signaling to the DS-TT 102*a*, if necessary.

That is, a method for performing port configuration of a 5GS for providing a time synchronization service according to an embodiment of the present disclosure, when the NEF 120 performs port configuration of the 5GS by the BMCA scheme, receiving, by the NEF, a BMCA result from the NW-TT 106. In addition, the method may further include, transmitting, by the NEF, a port configuration information and an Announce information to the DS-TT 102*a* based on the BMCA result. In an embodiment, the port configuration information and the Announce information may be transmitted from the NEF 120 to the DS-TT 102*a* through the PMIC signaling. Accordingly, an Announce message according to the Announce information may be created at a port configured as the master according to the BMCA result.

Meanwhile, the NW-TT 106 may transmit a port state along with the Announce message to the DS-TT 102*c* according to the BMCA result. That is, a method for performing port configuration of a 5GS for providing a time synchronization service according to an embodiment of the present disclosure, may include: when a GM is determined to be a TSN GM outside the 5GS, adding, by the NW-TT 106, a port configuration information to an Announce message based on a BMCA result; and transmitting, by the NW-TT 106, the Announce message to the DS-TT 102*c*. Accordingly, an Announce message according to Announce information may be created at a port configured as a master according to the BMCA result.

Figure 5:
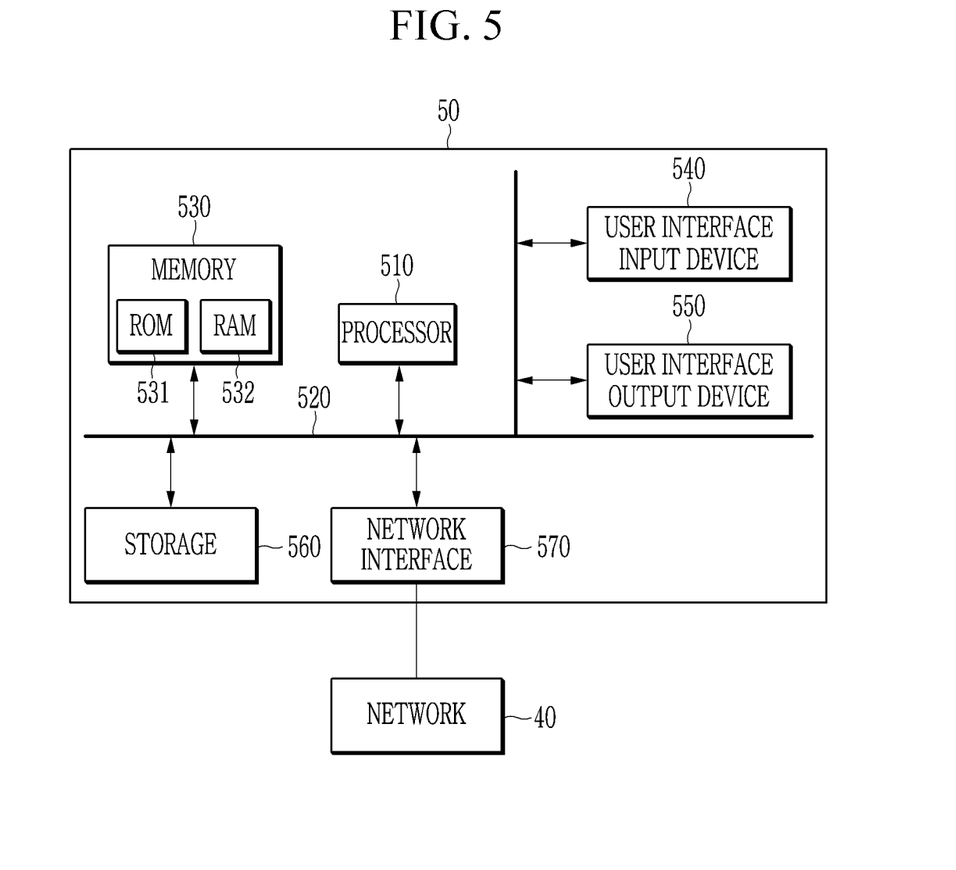
FIG. 5 is a block diagram illustrating a computing device according to an embodiment of the present disclosure.

FIG. 5 is a block diagram illustrating a computing device according to an embodiment of the present disclosure.

Referring to FIG. 9, a computing device 50 may be a network entity of a 5G system, for example, UE 100, DS-TT 102, UPF 104, NW-TT 106, RAN 108, TSN AF 110, PCF 112, SMF 114, AMF 116, UDM 118, NEF 120, and the like. Also, a method for performing port configuration of a 5GS for providing a time synchronization service according to embodiments of the present disclosure may be implemented using the computing device 50.

The computing device 50 includes at least one of a processor 510, a memory 530, a user interface input device 540, a user interface output device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 4.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, a method for performing port configuration of a 5GS for providing a time synchronization service according to embodiments of the present disclosure may be implemented as a program or software executed on the computing device 50, and the program or software may be stored in a computer-readable medium.

In addition, a method for performing port configuration of a 5GS for providing a time synchronization service of a 5GS according to embodiments of the present disclosure may be implemented with hardware that can be electrically connected to the computing device 50.

In particular, the network entity UE 100, DS-TT 102, UPF 104, NW-TT 106, RAN 108, TSN AF 110, PCF 112, SMF 114 and NEF 120 may perform the operations described with reference to FIG. 1 to FIG. 4.

For example, a network entity (i.e., NEF 120) that performs port configuration of a 5G system for providing a time synchronization service according to an embodiment of the present disclosure may include: a network interface 570 configured to transmit and receive data to and from other network entities; and a processor configured to perform port configuration of the 5GS in a BMCA scheme when a GM is determined to be a TSN GM, and perform port configuration of the 5GS in an external port configuration scheme when the GM is determined to be a 5GS GM inside the 5GS, or the TSN GM outside the 5GS that does not support the BMCA.

As another example, a network entity (i.e., NEF 120) that performs port configuration of a 5G system for providing a time synchronization service according to an embodiment of the present disclosure may include: a network interface 570 configured to transmit and receive data to and from other network entities; and a processor configured to add a port configuration information to an Announce message based on a BMCA result, and transmit the Announce message to a DS-TT.

As such, the processor 510 and the network interface 570 may be implemented to perform the operations described with reference to FIG. 1 to FIG. 4.

According to the embodiments of the present disclosure described so far, various applications can be supported by providing time synchronization services using 5GS exposure functions. Accordingly, a 5GS can provide deterministic communication according to time synchronization services required by various applications in a non-TSN environment as well as a TSN environment.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method for performing port configuration of a 5G system (5GS) for providing a time synchronization service, the method comprising:
   when a grandmaster (GM) is determined to be a Time Sensitive Networking (TSN) GM outside the 5GS, performing, by a Network Exposure Function (NEF), port configuration of the 5GS in a Best Master Clock Algorithm (BMCA) scheme; and
   when the GM is determined to be a 5GS GM inside the 5GS, or the TSN GM outside the 5GS that does not support the BMCA, performing, by the NEF, port configuration of the 5GS in an external port configuration scheme.

2. The method according to claim 1, further comprising:
   when the NEF performs port configuration of the 5GS in the BMCA scheme, receiving, by the NEF, a BMCA result from a Network TSN Translator (NW-TT).

3. The method according to claim 2, further comprising:
transmitting, by the NEF, a port configuration information and an Announce information to a Device Side TSN Translator (DS-TT) based on the BMCA result.

4. The method according to claim 3, wherein:
the port configuration information and the Announce information are transmitted from the NEF to the DS-TT through a Port Management Information Container (PMIC) signaling.

5. The method according to claim 3, wherein:
an Announce message according to the Announce information is created at a port configured as a master according to the BMCA result.

6. The method according to claim 1, further comprising:
when the NEF performs port configuration of the 5GS in the external port configuration scheme, transmitting, by the NEF, a port configuration information and an Announce information to a NW-TT or a DS-TT.

7. The method according to claim 6, wherein:
when the NEF transmits the port configuration information and the Announce information to the NW-TT, the port configuration information and the Announce information are transmitted through a Bridge Management Information Container (BMIC) signaling or a PMIC signaling.

8. The method according to claim 6, wherein:
when the NEF transmits the port configuration information and the Announce information to the DS-TT, the port configuration information and the Announce information are transmitted through a PMIC signaling.

9. The method according to claim 6, wherein:
an Announce message according to the Announce information is created at a port configured as a master according to the BMCA result.

10. A method for performing port configuration of a 5GS for providing a time synchronization service, the method comprising:
when a GM is determined to be a TSN GM outside the 5GS, adding, by a NW-TT, a port configuration information to an Announce message based on a BMCA result; and
transmitting, by the NW-TT, the Announce message to a DS-TT.

11. The method according to claim 10, wherein:
the Announce message is transmitted to another network entity at a port configured as a master according to the BMCA result.

12. A network entity performing port configuration of a 5GS for providing a time synchronization service, the network entity comprising:
a network interface configured to transmit and receive data to and from other network entities; and
a processor configured to perform port configuration of the 5GS in a BMCA scheme when a GM is determined to be a TSN GM, and
perform port configuration of the 5GS in an external port configuration scheme when the GM is determined to be a 5GS GM inside the 5GS, or the TSN GM outside the 5GS that does not support the BMCA.

13. The network entity according to claim 12, wherein:
when performing port configuration of the 5GS in the BMCA scheme, the processor receives a BMCA result from a NW-TT.

14. The network entity according to claim 13, wherein:
based on the BMCA result, the processor transmits a port configuration information and an Announce information to a DS-TT.

15. The network entity according to claim 14, wherein:
the port configuration information and the Announce information are transmitted from the NEF to the DS-TT through a PMIC signaling.

16. The network entity according to claim 14, wherein:
an Announce message according to the Announce information is created at a port configured as a master according to the BMCA result.

17. The network entity according to claim 12, wherein:
when the NEF performs port configuration of the 5GS in the external port configuration scheme, the processor transmits a port configuration information and an Announce information to a NW-TT or a DS-TT.

18. The network entity according to claim 17, wherein:
when the NEF transmits the port configuration information and the Announce information to the NW-TT, the port configuration information and the Announce information are transmitted through a BMIC signaling or a PMIC signaling.

19. The network entity according to claim 17, wherein:
when the NEF transmits the port configuration information and the Announce information to the DS-TT, the port configuration information and the Announce information are transmitted through a PMIC signaling.

20. The network entity according to claim 17, wherein:
an Announce message according to the Announce information is created at a port configured as a master according to the BMCA result.

* * * * *